E. MARELLI.
INDUCTION MOTOR.
APPLICATION FILED FEB. 19, 1909.
1,002,718.
Patented Sept. 5, 1911.
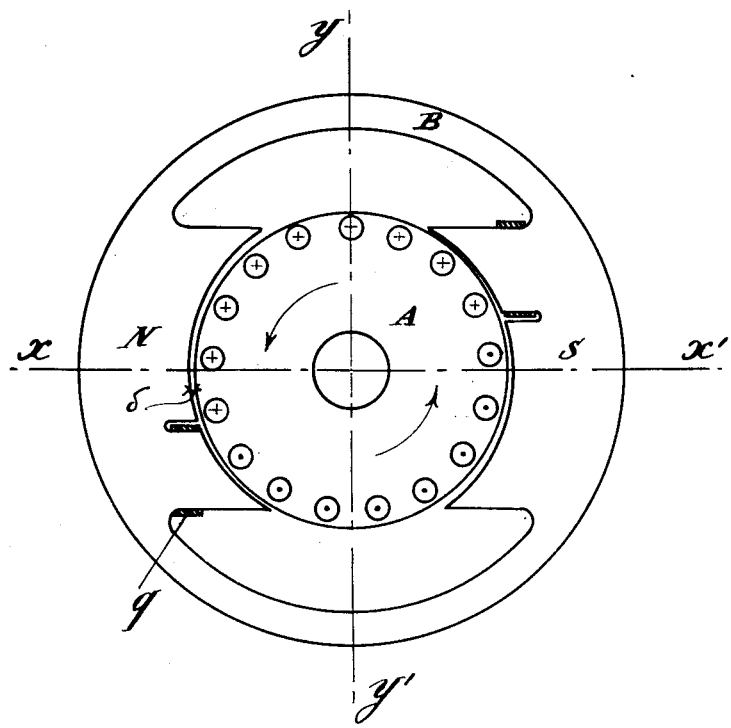

UNITED STATES PATENT OFFICE.

ERCOLE MARELLI, OF MILAN, ITALY.

INDUCTION-MOTOR.

1,002,718. Specification of Letters Patent. Patented Sept. 5, 1911.

Application filed February 19, 1909. Serial No. 478,916.

*To all whom it may concern:*

Be it known that I, ERCOLE MARELLI, a subject of the King of Italy, residing at No. 10 Via S. Radegonda, Milan, in the Kingdom of Italy, have invented certain new and useful Improvements in Induction-Motors, of which the following is a specification.

The present invention has for its object a single phase induction motor with ordinary short circuit armature and characterized by a special arrangement of the field. In accordance with the invention the field is provided with two or more divided poles the pole piece of which runs concentrically with the axis for a certain distance but elsewhere somewhat eccentrically to the axis so that the air gap is of the same cross section in the first portion while elsewhere its cross section gradually widens. That part of the pole piece upon which the air gap runs concentrically with the axis may be formed as a separate pole provided with a short circuit coil of sheet copper or the like.

The invention is illustrated in the accompanying drawing.

A is the armature of the motor which is provided with an ordinary short circuit winding such as is customary with single and multi-phase motors. The magnet field comprises two poles N and S the pole pieces of which do not as is customary run concentrically with the axis throughout the entire pole but are concentric through a part of the pole only (which in the example here illustrated constitutes a separate pole piece) while throughout the rest of the pole it is formed eccentrically so that the air gap $\delta$ here gradually widens.

The operation of the device is as follows:—If the inducing coils are energized by alternating current a field is formed in the air gap which has the same density throughout the first part of the pole in all sections but gradually diminishes in density throughout the rest of the pole. Assuming the flux produced by one of the poles to be resolved into equal parts the plane dividing these two partial fluxes (the axis of the field) no longer passes through the pole axis $x$—$x'$ but is displaced somewhat toward the part of the pole whose surface is concentric with the axis. From this it follows however that the armature wires for the time being beneath a pole a larger number are traversed by current induced in a given direction than by that induced in the opposite direction.

With poles of the polarity represented in the drawing the number of the armature wires beneath the north pole in which currents are induced the direction of which runs into the surface of the paper (positive wires) is greater than the number of wires in which the induced current has a direction proceeding away from the surface of the paper (negative wires). Beneath the south pole the conditions are reversed; here the number of negative wires is the larger. According to Flemming's law the negative conductors beneath the north pole and the positive conductors beneath the south pole impart a clockwise rotary moment to the armature while the positive conductors beneath the north pole and the negative conductors beneath the south pole produce an opposite rotary moment. As however the number of the latter is greater than the number of the former the resultant rotary moment rotates the armature in a contra clockwise direction as indicated by the arrows.

Now if that part of the pole where the pole piece runs concentrically with the axis is formed as a separate pole and provided with a short-circuit winding $q$ as is known the energizing of this pole experiences a phase retardation owing to the Foucault currents existing in the short circuit winding. This phase retardation however likewise exerts a rotary moment on the armature wires which acts in the direction indicated by the arrow and is therefore cumulative to the rotary moment acting in the same direction which has already been considered. The improved motor therefore presents a strong starting rotary moment even with voltage lower than the normal. It is likewise possible to regulate the speed within wide limits by inserting a resistance in the feed line.

What I claim and desire to secure by Letters Patent of the United States is:—

1. A motor of the class specified comprising a rotating cylindrical armature having the usual short circuit winding, and a magnetic field consisting of pole pieces having faces adjacent to the armature, the face of each pole piece being partially concentric and partially eccentric to the axis of the armature and the concentric and eccentric portions of the pole pieces arranged in reverse positions relatively to each other so that between each pole piece and the armature is formed an air gap which is uniform in width throughout a portion of its length and gradually widens throughout the remaining portion of the length of the same whereby the starting of the motor is facilitated with high power.

2. A single phase induction motor comprising a rotating cylindrical armature having the usual short circuit winding, and pole pieces having faces adjacent to the armature, each pole piece face for a part of its width being disposed concentrically and the remaining portion of the said face arranged eccentrically with relation to the axis of the motor so that an air gap is formed between each pole piece face and the armature of uniform width for a portion of its length and gradually merging into a widened portion, the portions of the gaps of uniform width and the widened portions being in reverse position relatively to the armature.

In testimony whereof I affix my signature in presence of two witnesses.

ERCOLE MARELLI.

Witnesses:
MICHAEL HINSDORFER, Jr.,
R. CARLO PALVOTI.